Aug. 4, 1953

A. S. VOLPIN 2,647,720

AUTOMATIC LUBRICATED PLUG VALVE

Filed Oct. 6, 1947

A. S. VOLPIN
*INVENTOR.*

BY *Lester B. Clark*
*Ray L. Smith*

*ATTORNEYS*

Aug. 4, 1953

A. S. VOLPIN 2,647,720

AUTOMATIC LUBRICATED PLUG VALVE

Filed Oct. 6, 1947

A. S. VOLPIN
INVENTOR.

Lester B Clark
& Ray L. Smith
ATTORNEYS.

Patented Aug. 4, 1953

2,647,720

UNITED STATES PATENT OFFICE 2,647,720

AUTOMATIC LUBRICATED PLUG VALVE

Alexander S. Volpin, Houston, Tex.

Application October 6, 1947, Serial No. 778,147

19 Claims. (Cl. 251—93)

The invention relates to an automatic lubricated valve which is simple and economical in construction and provides an unusually large reservoir of sealing material and replacement of the gland packing while the valve is under pressure.

It is one of the objects of the invention to provide a lubricated plug valve for pipe lines such as gathering lines for oil and gas, cycling and recycling plants, and for Christmas trees of well heads where the line pressure on the valve is utilized to automatically distribute lubricant or sealing material to the downstream sealing surfaces.

Another object of the invention is to provide a lubricated type of plug valve wherein an unusually large reservoir is embodied in the valve body so that the valve may be operated for long periods with infrequent replenishing of the sealing material due to the provision of a large capacity circumferential reservoir within the body.

Another object of the invention is to provide a closure for the valve body which serves to provide a base for the plug chamber to define the reservoir for sealing material.

Another object of the invention is to provide a single reservoir in a plug valve for sealing material so as to automatically furnish sealing material to the downstream side of the plug and also to provide a lubricant seal for the closure member in the body.

Another object of the invention is to provide a lubricated plug valve wherein sealing material may be introduced at either end of the plug to provide a seal for the plug in closed position.

Another object of the invention is to provide a plug valve having a separable stem for the movement of the plug.

Still another object of the invention is to provide a gland type packing for plug valve stems in combination with cooperating metal sealing faces on the stem and valve body where the faces may move into sealing position to permit replacement of the gland packing under pressure.

Still another object of the invention is to provide a replaceable gland packing assembly for rotatable valve stems wherein a seal is provided upon axial movement of the valve stem during the replacing operation while the plug holds the line pressure from passing through the valve.

A still further object of the invention is to provide a dual packing assembly for rotatable valve stems wherein a metal to metal seal is created due to the pressure on the valve when a fusible member permits axial movement of the valve stem.

Other and further objects of the invention will be readily apparent when the following description is considered in connection with the accompanying drawings, wherein.

Figure 1:
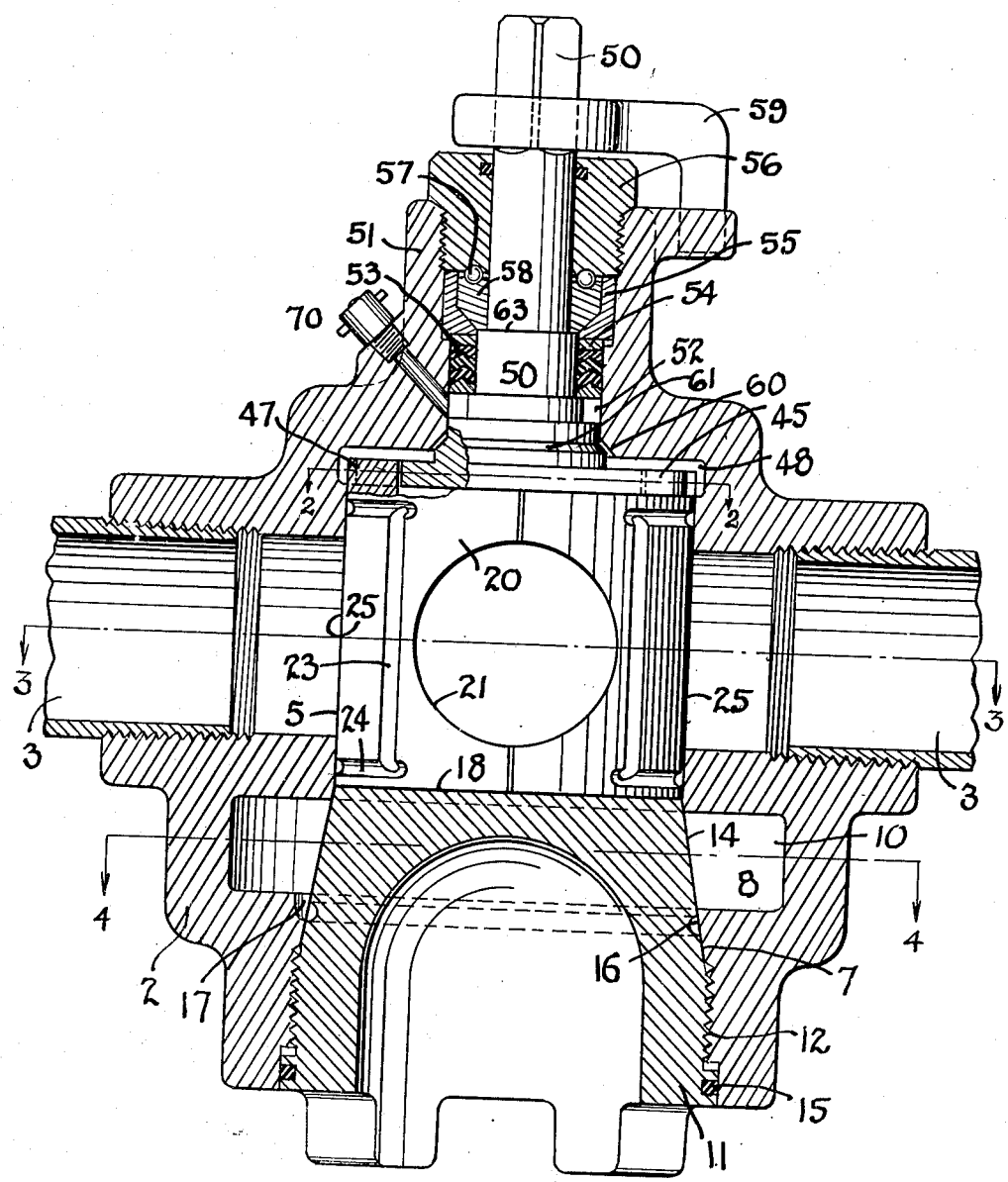
Fig. 1 is a vertical sectional view of the valve embodying the invention and illustrating the plug in closed and sealed position.
Figure 3:
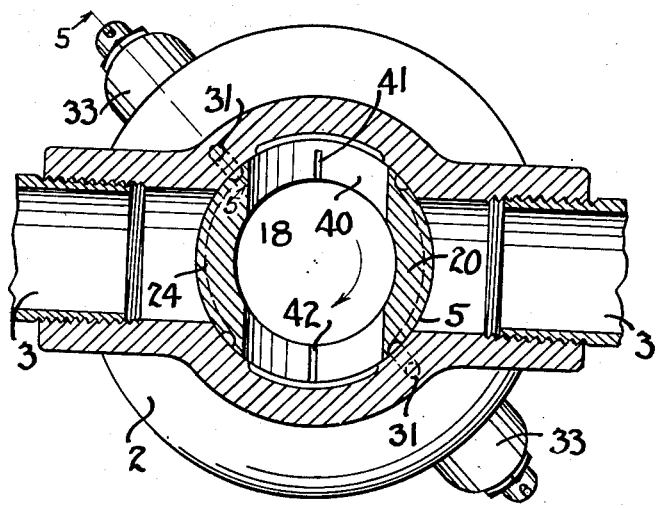
Figure 4:
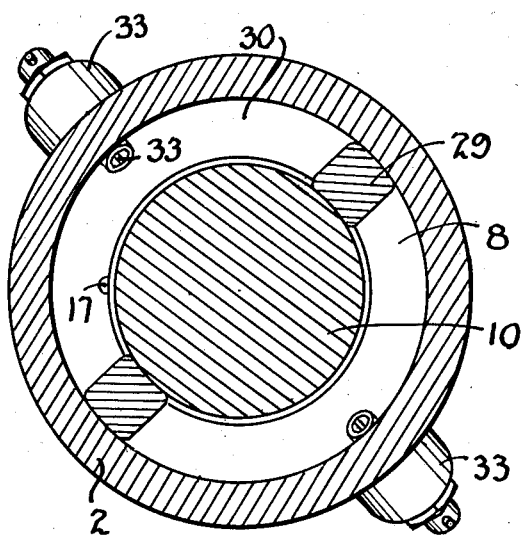

Figs. 3 and 4 are sections taken on the lines 3—3 and 4—4 respectively in Fig. 1.

Figure 5:
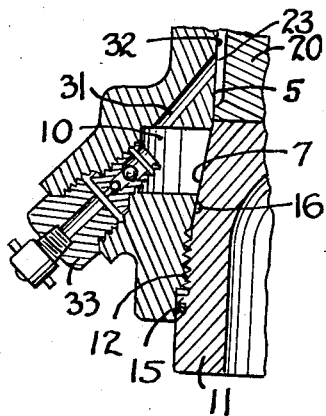

Fig. 5 is a section taken on the line 5—5 of Fig. 3.

Figure 6:
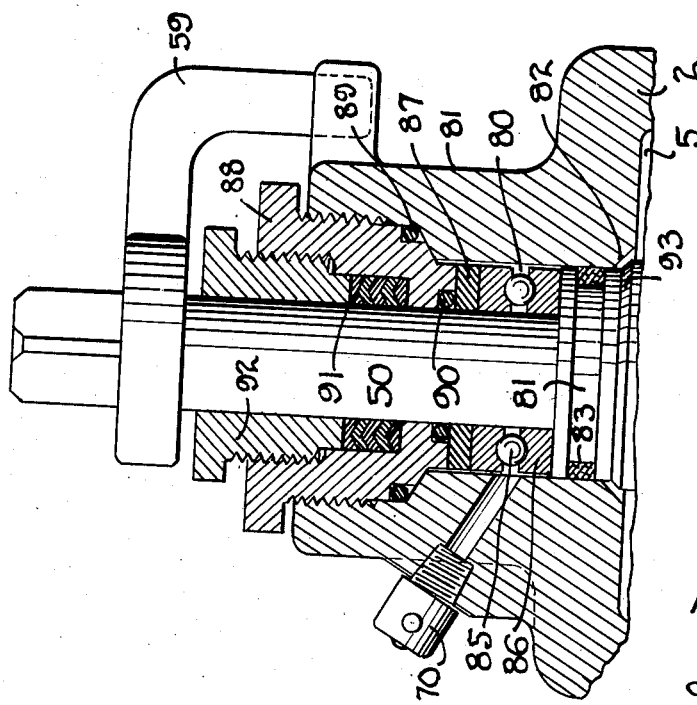

Fig. 6 is a vertical section of the stem packing assembly including a fusible member to permit the formation of a seal about the stem in event the valve is subjected to extreme heat.

Figure 7:
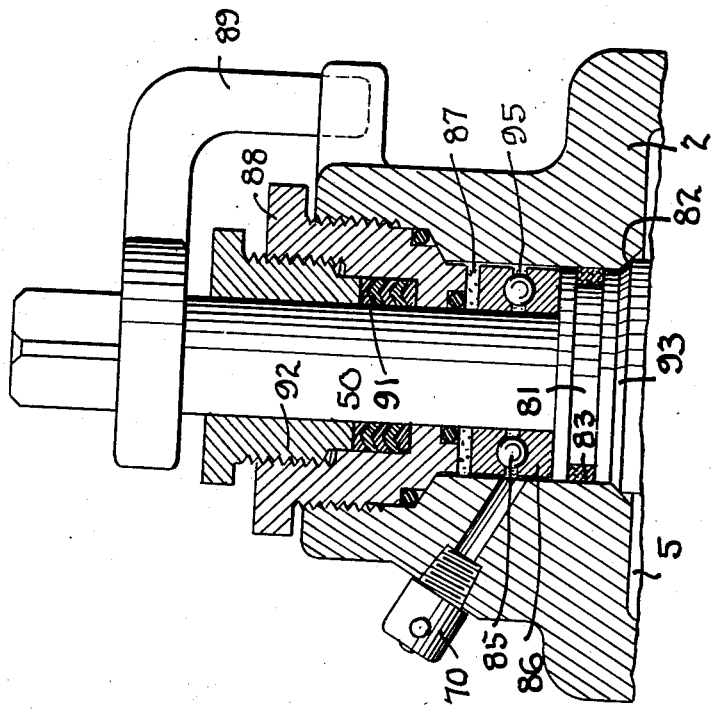

Fig. 7 is a section similar to Fig. 6, illustrating the arrangement after the valve has been subjected to heat.

In Fig. 1 the valve body 2 has a flow passage 3 extending therethrough to receive the ends of the pipe line in which the valve is to be incorporated. This flow passage 3 is intercepted by a vertical chamber 5 which is shown as being of uniform diameter where it intersects the flow passage 3. Below the flow passage the body is tapered at 7 to provide an open base.

There is a recessed area 8 adjacent the base of the valve body and this recess is of considerable size so as to receive a substantial quantity of lubricant or sealing material to seal the valve plug and the body. In order to form this sealing material reservoir 10, a base plug or closure 11 is threaded at 12 into the tapered portion of the chamber opening 5 and this plug is tapered at 14 so as to fit snugly in the taper 7. A packing ring 15 is disposed to seal between the closure member 11 and the body. In order, however, to form a lubricant or plastic seal between the closure 11 and the body, a distribution groove 16 has been shown connected to a short passage 17 leading into the reservoir 10. In this manner any pressure applied to the sealing material in the reservoir 10 will cause a seal to be formed with the tapered surface 7.

The upper or inner end 18 of the closure 11 serves to form the base of the chamber 5 against which the plug member 20 may abut.

The plug member 20 is shown in Fig. 1 as being made up of a hollow cylinder, and having the opening 21 therein to be aligned with the flow passage 3.

Each side of the plug 20 is provided with vertical distribution grooves 23 and upper and lower horizontal distribution grooves 24, which grooves are connected at their ends so as to form a continuous sealing area about the flow port 25 at each side of the chamber 5.

The sealing material from the reservoir 10 will be forced into the distribution grooves, due to the fact that the pressure on the high pressure side of the valve will enter the valve chamber because the plug will tend to flex due to such pressure as the pressure moves into the reservoir 10. This pressure might, of course, channel through the sealing material, but to prevent this the movable barriers 29 are provided on opposite sides as seen in Fig. 4 to move behind the sealing material due to the line pressure against such barrier. In this manner sealing material from the portion 30 of the reservoir will move into the conduit 31 Fig. 5 which extends upwardly and inwardly into the wall 32 and the groove 23.

The plug 20 may be in the form of substantially a cylinder 30 which is slotted at 41 and slit at 42 entirely through the wall so as to provide for a limited amount of resiliency in the plug member as seen in Fig. 3.

In order to introduce sealing material into the reservoir 10, the fittings 33 are arranged on opposite sides of the body, as seen in Figs. 4 and 5. This pressure will also force sealing material into the opening 17 leading to the groove 16, to seal the closure member. In this manner, the high pressure on the valve or the line in which the valve is incorporated exerts a pressure on the barrier 29 so that movement of such barrier serves to automatically distribute sealing material to the downstream side of the valve to form a seal at the downstream port.

Figure 2:
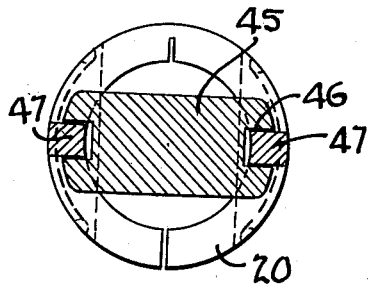
Fig. 2 is a section taken on the line 2—2 of Fig. 1 and illustrating the separable stem head for turning the valve plug.

In order to actuate or rotate the plug member 20, a crosshead 45 is provided, as best seen in Figs. 1 and 2. This cross-head is arranged with recessed ends 46 which fit about the upstanding lugs 47 arranged substantially on a diameter of the plug. This cross-head is, of course, axially movable with respect to the plug due to the provision of the space 48, best seen in Fig. 1 at the top of the chamber 5, so that there will be limited axial movement of the plug and the cross-head 45. The cross-head 45 has the valve stem 50 formed therewith and this stem extends through the upper reduced end 51 of the body. The opening 52 is arranged to receive the gland packing 53 as seen in Fig. 1 and this packing is retained in position by a junk ring 54, the bushing 55, and the gland 56, which gland is screwed into the upper end of the body 51. This gland also abuts against the anti-friction bearings 57 which are disposed against the bearing ring 58. The bushing 55 retains the packing in position while the bearings 57 reduce the torque required to turn the valve. A stop and indicator arm 59 may be carried by the stem.

One of the particular features of this valve stem packing assembly resides in the arrangement of a beveled seat 60 in the body where the chamber 5 merges with the neck or packing opening 52. The stem 50 has a complementary beveled face 61 which is seen in Fig. 1 as being spaced from the seat 60 and retained in such spaced relation by the gland 56 and the bearings 57 due to the bearing ring 58 abutting against a shoulder 63.

In event that the bearings 57 or the packing 53 require replacement, it seems obvious that by a slight unscrewing of the gland 56, that the pressure within the valve will tend to lift the cross-head 45 and the stem 50. This axial movement of the stem causes the face 61 to move into engagement with the face 60 so as to form a metal to metal seal to prevent any leakage of the pressure from the pipe line or the valve chamber. When this seal is thus formed with the cooperating faces, the gland 56 may then be removed and the bearings or the packing, or both, replaced at will while the valve is under pressure.

In order to provide for sealing material for the gland packing 53 an additional fitting 70 is shown in the upper left hand portion of Fig. 1. This additional fitting permits introduction of sealing material into the packing area 52 and this sealing material will move upward due to line pressure and thus augments the sealing of the gland packing. When it is desired to remove the gland packing pressure through the fitting 70 may be used to expel the packing.

Figs. 6 and 7 show a modified arrangement of the stem packing wherein the passage 80 in the neck 81 of the valve body has the sealing face 82 at its lower end where it merges with the valve chamber. The stem 50 is substantially the same as described in connection with Fig. 1 except that it may have an annular wiping ring 83 and the anti-friction bearings 85 may be arranged in the bearing race 86 about the stem 50.

This bearing race 86 will be held in position by a fusible ring 87 of any suitable material, which is arranged to melt or become softened so that it may flow under pressure at a predetermined temperature. This fusible ring 87 abuts the gland 88 which is similar to the gland 56. This gland in turn carries pressure type seal rings 89 and 90 to seal the gland with the body and the stem respectively. A conventional packing 91 is retained by the adjustable nut 92 threaded into the gland 88.

The stem 50 has the cooperating face 93 thereon. The cooperating faces 82 and 93 are seen as the faces 60 and 61 of Fig. 1.

If for some reason it is desired to replace the bearings 86, the fusible ring 87, the packing rings 89 and 90, or the packing 91, it is only necessary to unscrew the gland 88 sufficiently to allow the valve stem to move upwardly until the faces 82 and 93 engage each other. A metal to metal seal is then formed and any desired replacement may be made.

Fig. 7 shows a fusible ring 87 as having been melted sufficiently to allow axial movement of the stem and the forming of the seal with the faces 82 and 93.

The fusible metal is shown at 95 as having moved down in around the bearing in permitting the axial movement.

The invention contemplates a high pressure valve which enhances the safety of the valve because the stem packing and the stem thrust parts may be replaced while the valve is under pressure to avoid shut down of the line in which the valve is embodied. The base or closure is sealed with the material from the reservoir and the large circumferential reservoir in the body requires only infrequent replenishing of the sealing material. The line pressure on the valve automatically feeds the sealing material into sealing position. And in event of fire, a safe stem seal is automatically formed by melting of the fusible ring, as seen in Figs. 6 and 7. This permits the automatic formation of a metal to metal seal.

In connection with the sealing of the plug member, the passage 31 is only in engagement with the distribution groove when the valve is in fully closed or fully open position, which prevents wasting of the sealing material during operation of the valve. This occurs due to the fact that the reservoir port 31 enters the side of the valve chamber at an elevation above the horizontal groove 24 so that when the plug is initially moved, the vertical groove moves out of alignment with the reservoir until the plug is again fully to its terminal.

Broadly the invention contemplates a lubricated plug valve having a large sealing material reservoir in the body; a replaceable valve stem sealing assembly so that the stem may be repacked under pressure while the valve stem is sealed to the body; and a fusible member arranged in the valve stem packing assembly so as to permit the creation of a metal to metal seal when the valve is subjected to excessive heat.

What is claimed is:

1. An automatically lubricated plug valve comprising, a body, a plug chamber therein, a flow passage intersecting said chamber, a sealing material reservoir co-axially disposed with but spaced longitudinally of said chamber, a closure member extending into said body to form a base for said chamber and define said reservoir as an annular chamber thereabout, means to introduce sealing material through said body into said reservoir, a plug in said first named chamber, sealing material distribution grooves on said plug to seal with said body, means in said body to conduct sealing material from said reservoir to said grooves only when said plug is in fully closed position, barriers movable in said reservoir in response to line pressure on the valve in closed position to move sealing material to said means, a plug head to turn said plug, a stem mounted in said body to turn said head, packing last-mentioned means to seal between said stem and body, and cooperating metal seats on said stem and on said body to provide a seal for said chamber upon axial movement of said stem whereby said packing means may be replaced while pressure is on the valve.

2. A lubricated plug valve comprising, a body, a plug chamber and a plug therein, upstream and downstream flow passages intersecting said chamber, a closure member for one end of said chamber, a co-axial sealing material reservoir formed in said body and defining an annular chamber in said body about said closure, means to introduce sealing material therein, a sealing material distribution groove about each said passage when the valve is in closed position, and a reservoir passage from said reservoir to each said groove, and barrier means in said reservoir movable in response to predominant line pressure entering said reservoir to urge sealing material from said reservoir thru said reservoir passage to the distribution groove about the downstream flow passage to effect a seal.

3. A lubricated plug valve comprising, a body having a plug chamber, a plug therein, upstream and downstream flow passages intersecting said chamber, a member insertable and affixed in the end of said chamber, a circumferential recess about said member constituting a sealing material reservoir, means to introduce sealing material into said reservoir, a sealing material groove about each said flow passage when the valve is in closed position, a reservoir passage from said reservoir to each of said grooves, and barrier means in said reservoir movable in response to predominant line pressure entering said reservoir to urge sealing material thru the other reservoir passage to the downstream groove to effect a seal.

4. A lubricated plug valve comprising, a body, a plug chamber and a plug therein, upstream and downstream flow passages intersecting said chamber, a closure for said chamber, a co-axial sealing material reservoir formed substantially in said body and defining an annular chamber about said closure, means to introduce sealing material therein, a sealing material distribution groove about each said passage when the valve is in closed position, and a passage from said reservoir to each said groove whereby line pressure may enter said reservoir and urge sealing material to the distribution groove about the downstream passage to effect a seal, and a pair of barriers movable in said reservoir by the line pressure which is applied to and moves such barriers.

5. A lubricated plug valve comprising, a body having a plug chamber, a plug therein, upstream and downstream flow passages intersecting said chamber, a closure insertable in the end of said chamber, a circumferential recess about said closure constituting a sealing material reservoir, means to introduce sealing material therein, a sealing material groove about each said passage when the valve is in closed position, a passage from said reservoir to each said groove whereby line pressure may enter said reservoir and urge sealing material to the downstream groove to effect a seal, and a pair of barriers movable in said reservoir by the line pressure which is applied to and moves such barriers.

6. A sealing material reservoir for a lubricated valve having a sealing side, the configuration of said reservoir defining an annular chamber, means to introduce sealing material therein, a passage therefrom to the sealing side of said valve, means to admit line pressure on said valve to said reservoir whereby the sealing material may be urged to said sealing side to effect a seal and movable barrier means therein movable in response to line pressure.

7. In a lubricated plug valve, a body having opposed flow ports, a plug in said body movable between open and closed positions with respect to said ports and provided with diametrically opposed lubricant grooves disposed to encircle said ports when the plug is in the closed position, an annular lubricant reservoir in said body coaxial with said plug, line pressure-responsive barrier means movably disposed in said reservoir, means to introduce lubricant into said reservoir, means to introduce line pressure therein, and lubricant-conduction passages from said reservoir communicating with said grooves only when said valve is in the closed position.

8. A lubricant reservoir for a lubricated valve having opposed flow ports and a valve member therefor provided with opposed sealing faces for said ports, said reservoir being of annular configuration, a pair of barrier members movably disposed in opposite sides of said reservoir dividing said reservoir into separate chambers, lubricant passages from said chambers to said sealing faces, and means to admit pressure on said valve into said chambers.

9. A lubricant reservoir for a lubricated valve having opposed flow ports and a valve member therefor provided with opposed sealing faces for said ports, said reservoir being of annular configuration, a pair of barrier members movably disposed in opposite sides of said reservoir dividing said reservoir into separate chambers, lubricant passages from said chambers to said sealing faces, means to introduce lubricant into each of said chambers, and means to admit pressure on said valve into said chambers.

10. A lubricant reservoir for a lubricated valve having opposed flow ports and a valve member therefor provided with opposed sealing faces for said ports, said reservoir being of annular configuration, a pair of barrier members movably disposed in opposite sides of said reservoir dividing said reservoir into separate chambers, lubricant passages from said chambers to said sealing faces, means for introducing lubricant separately into each of said chambers, and means to admit pressure on said valve into said chambers.

11. A lubricant reservoir arrangement for a lubricated plug valve having a sealing side, a body and a body closure therefor, the configuration of said reservoir defining an annulus about said closure, means to introduce lubricant into said reservoir, a lubricant passage from said reservoir to said sealing side, means to admit pressure on said valve to said reservoir, movable barrier means in said reservoir movable in response to said pressure, a lubricant sealing groove about said body closure, and a lubricant passage from said reservoir to said groove.

12. A lubricated plug valve, comprising, a body, a plug chamber in said body having opposed flow ports, a removable closure for said chamber having engaging sealing surfaces therewith, a plug in said chamber provided with opposed sealing faces for said ports, a lubricant reservoir of annular configuration in said body, lubricant passages from said reservoir to each of said sealing faces and to said sealing surfaces, means to admit line pressure into said reservoir, and barrier means disposed in said reservoir and movable therein in response to said line pressure.

13. A plug valve according to claim 12 having means for introducing lubricant material into said reservoir on opposite sides of said barriers.

14. In a body including threadedly connected members for the containment of high fluid pressure in said body, means for sealing said members, comprising, a sealing material groove between engaging surfaces of said members, a sealing material reservoir in said body communicating with said groove, means to introduce sealing material into said reservoir, means to admit such high pressure into said reservoir, and movable barrier means in said reservoir movable therein in response to said pressure.

15. In a body including connected members in fixed relation for the containment of high pressure fluid in said body, an arrangement for sealing said members, comprising, a sealing material groove between engaging surfaces of said members, a sealing material reservoir in said body communicating with said groove, means to introduce sealing material into said reservoir, means to admit such high pressure into said reservoir, and movable barrier means in said reservoir movable therein in response to said pressure.

16. In a pressure vessel having an opening and a closure therefor, an arrangement for sealing said closure, comprising, a sealing material groove between engaging surfaces of said closure and the portion of said vessel defining said opening, a sealing material reservoir in the body of said vessel about said closure communicating with said groove, means to introduce sealing material into said reservoir, means to admit pressure in the vessel into said reservoir, and barrier means in said reservoir movable in response to said fluid pressure.

17. In a lubricated valve having a body provided with a flow port, a chamber intersecting said flow port, a valve member in said chamber, means to move said valve member to open and closed positions, sealing faces in said chamber and about said flow port, a lubricant reservoir in said valve connected to said faces by lubricant conduction passages, means to admit pressure on said valve into said reservoir, and multiple barrier means disposed in said reservoir and movable in response to line pressure.

18. In a lubricated valve, a body having flow ports, a chamber in said body intersecting said flow ports, a movable closure therein and adapted to control fluid flow therethrough, a sealing side in said chamber, a lubricant reservoir in said body connected to the sealing side by lubricant conduction passages, barrier means in said reservoir movable in response to line pressure on said valve, and means insertable in said reservoir to inject lubricant therein, said last means being disposed to limit the travel of said barrier means.

19. In a lubricated valve, a body having a pair of flow ports and a movable closure therefor adapted to control fluid flow through said valve, a sealing surface at each port, an annular lubricant reservoir, at least two barriers therein movable in response to pressure on said valve, lubricant conduction passages from said sealing surfaces to said reservoir, a pair of elements positioned in said reservoir and disposed in diametrically opposed positions, each of said elements having a passageway for the conduction of lubricant into said reservoir, said elements further serving to limit the travel of said barriers in said reservoir.

ALEXANDER S. VOLPIN.

References Cited in the file of this patent

UNITED STATES PATENTS

| Number | Name | Date |
|---|---|---|
| 21,237 | Winslow | Aug. 17, 1858 |
| 2,027,108 | Kuehling | Jan. 7, 1936 |
| 2,093,091 | McCarthy | Sept. 14, 1937 |
| 2,107,182 | Henderson | Feb. 1, 1938 |
| 2,421,879 | Hamer | June 10, 1947 |
| 2,433,638 | Volpin | Dec. 30, 1947 |